Figure 1:
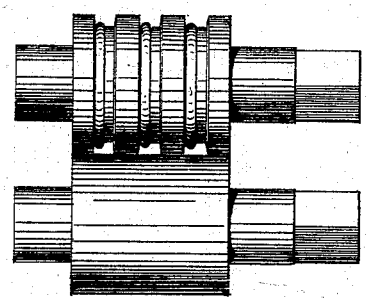

J. B. BLACK.
Manufacture of Joints for Bracelets.

No. 139,361.  Patented May 27, 1873.

WITNESSES,  
John D. Thurston  
Thomas T. Cosgrove

INVENTOR,  
James B. Black

UNITED STATES PATENT OFFICE.

JAMES B. BLACK, OF PROVIDENCE, RHODE ISLAND, ASSIGNOR TO A. O. BAKER, OF SAME PLACE.

IMPROVEMENT IN THE MANUFACTURE OF JOINTS FOR BRACELETS.

Specification forming part of Letters Patent No. 139,361, dated May 27, 1873; application filed March 29, 1873.

*To all whom it may concern:*

Figure 2:
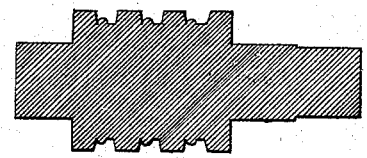
Figure 3:
Figure 4:
Figure 5:

Be it known that I, JAMES B. BLACK, of Providence, in the county of Providence and State of Rhode Island, have invented certain new and useful Improvements in the Art of Making Joints for Bracelets; and I do hereby declare that the following specification, taken in connection with the drawing, making a part of the same is a full, clear, and exact description thereof:

Figure 1 is a view of the rolls used in forming the metal. Fig. 2 is a vertical section of the top roll, Fig. 1. Fig. 3 is a piece of metal as it comes from the roll. Fig. 4 shows the two parts detached which form the joint. Fig. 5 represents the joint complete.

The object of my invention is to produce a joint which shall not only be much more durable than those now in use, but will at the same time be capable of being manufactured with much greater facility, and consists in the method of making the same, hereinafter described.

It is well understood that the durability of this class of articles depends almost entirely upon the joints, while their cost is enhanced or diminished in proportion to the time occupied in their manufacture.

In my invention I make use of two rollers, operating together, as shown in Fig. 1, the upper one being so designed that the strip of metal passing through will be formed with a narrow groove, as shown in Fig. 3. The strip of metal thus made is then cut into pieces of the desired length, two of which are required to make a single joint. To one of these sections I solder two pieces of small tubing, one at each end, and to the other, one piece in the center, as shown in Fig. 4. The two parts so formed are then placed together and a pin or rivet driven through the whole, thus making a complete joint, as shown in Fig. 5.

I do not claim as a part of my invention the rollers herein described, but have merely referred to them for the purpose of showing the manner in which the strips of metal are formed.

What I claim as my invention, and desire to secure by Letters Patent, is—

The method herein described of forming a joint for bracelets, consisting in the rolling of metal into suitable strips of the form shown, and the subsequent cutting and soldering thereto sections of tubing, in the manner substantially as specified.

JAMES B. BLACK.

Witnesses:
 THOMAS F. COSGROVE,
 JOHN D. THURSTON.